United States Patent [19]
Sisco et al.

[11] Patent Number: 5,356,251
[45] Date of Patent: Oct. 18, 1994

[54] COLLAPSIBLE VOID FILLING APPARATUS

[75] Inventors: Robert W. Sisco, Hammond, Ind.; Thomas J. Hamilton, Palos Heights, Ill.

[73] Assignee: Corrugated Systems, Inc., Dolton, Ill.

[21] Appl. No.: 978,248

[22] Filed: Nov. 18, 1992

[51] Int. Cl.⁵ .............. B61D 45/00; B63B 25/24; B65D 81/04; B60P 7/16

[52] U.S. Cl. .............. 410/154; 410/155; 229/117.03; 206/593; 206/814

[58] Field of Search ............ 410/117, 118, 121, 154, 410/155; 229/93, 117, 117.03; 206/586, 593, 814

[56] References Cited

U.S. PATENT DOCUMENTS

| | | | |
|---|---|---|---|
| 3,534,691 | 10/1970 | Carlomagno, Jr. | 410/155 |
| 3,951,730 | 4/1976 | Wennberg et al. | 206/521 X |
| 4,363,579 | 12/1982 | Rogers | 410/154 |
| 4,372,717 | 2/1983 | Sewell et al. | 410/154 |
| 4,444,535 | 4/1984 | VanMersbergen | 410/121 |
| 4,951,823 | 8/1990 | Butkus et al. | 206/586 |
| 5,000,376 | 3/1991 | Wojdyla | 410/154 X |
| 5,040,683 | 8/1991 | Marsilio | 206/814 X |
| 5,102,272 | 4/1992 | Woods et al. | 410/154 |

*Primary Examiner*—Michael S. Huppert
*Assistant Examiner*—Stephen Gordon
*Attorney, Agent, or Firm*—Potthast & Ring

[57] ABSTRACT

A collapsible void filling apparatus (10) with at least one multiple elongate hollow rectilinear member (14, 16, 74 80) arranged in side by side relationship to form a body (21) for insertion into a void (24) between stacks of cargo (12) in a freight vehicle to prevent shifting of the cargo with overlapping, reinforced, cross support walls (23, 30, 31), a locking member (50) insertable from the end of one of the hollow members to a locking position which prevents collapse of the void filler body (21) during handling while allowing a clear view through the hollow member and which also functions as a handle for use in inserting the void filling apparatus (10, 10', 10", 10"') into the void (24) and tab members (56, 58) for holding the locking member (50) in the locking position (FIG. 1).

24 Claims, 3 Drawing Sheets

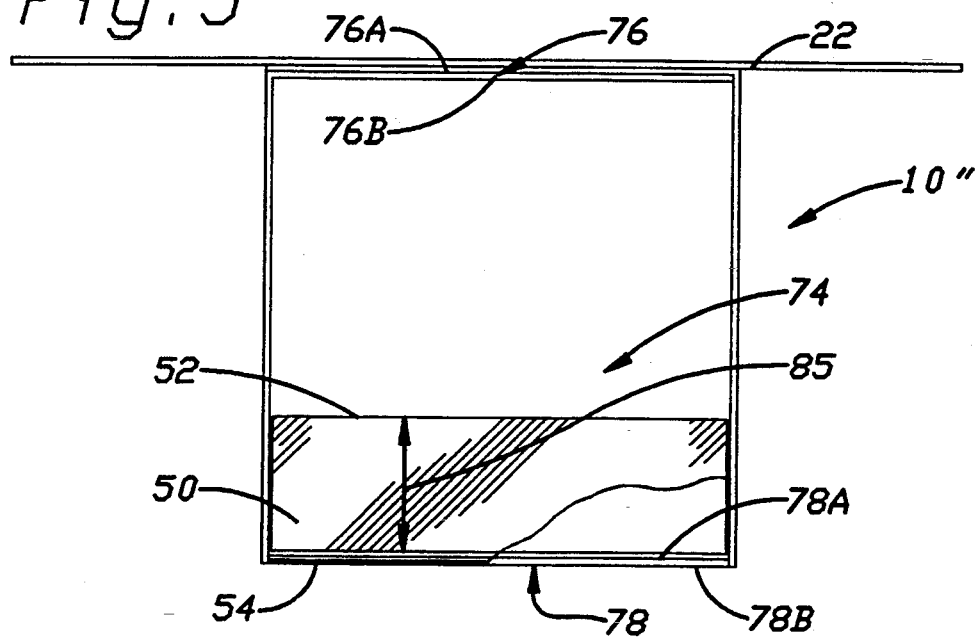
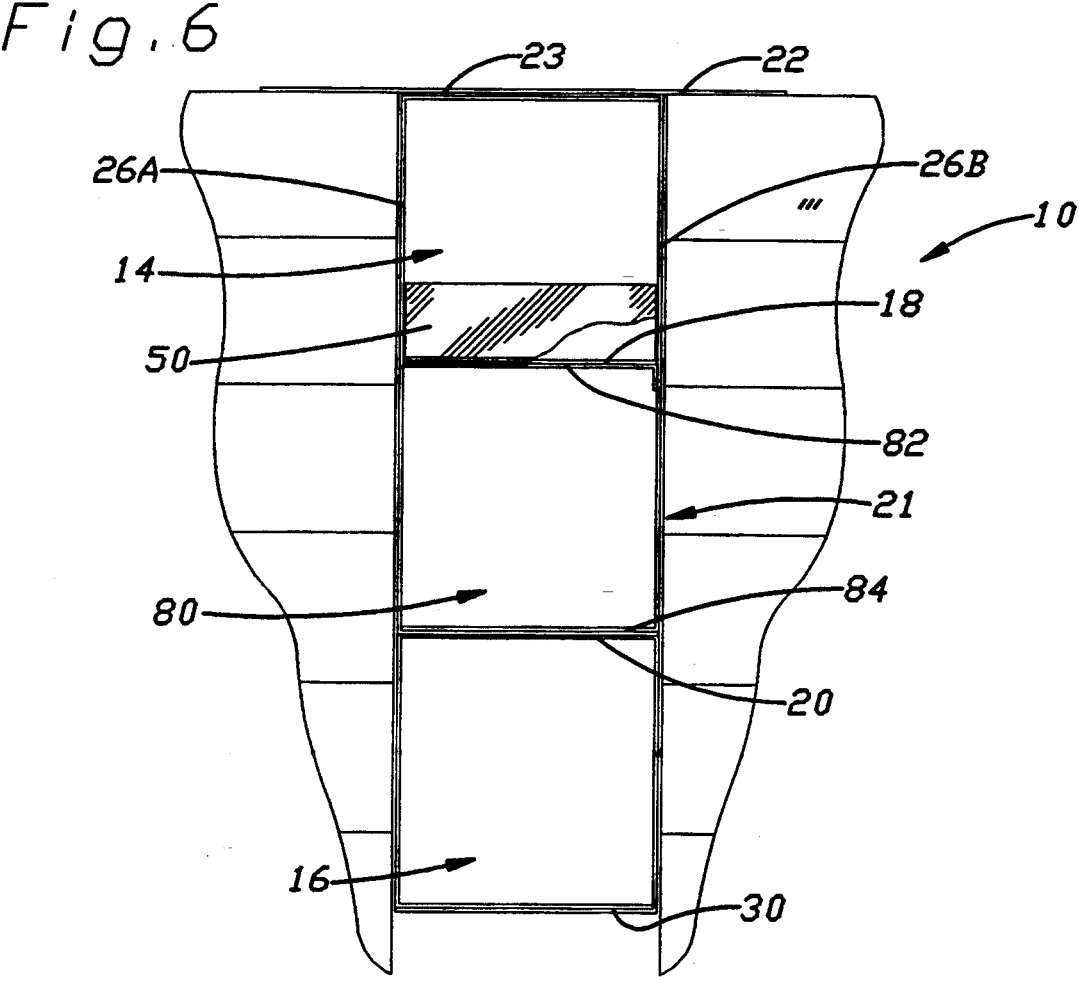

COLLAPSIBLE VOID FILLING APPARATUS

BACKGROUND OF THE INVENTION

1. Field of the Invention

The invention generally relates to void filling apparatus for filling interstices to prevent separated items of cargo in a confined carrier from shifting or tipping toward each other during transport and, particularly, to a hollow, collapsible void filling apparatus and method of using same.

2. Description of the Related Art Including Information Disclosed Under 37 CFR 1.97-1.99

Numerous void filling structures, or void fillers, are known of the type having a substantially hollow collapsible body of cardboard or the like and a hanger for suspending the void filler between two spaced stacks of freight to be kept separated from tipping, sliding or otherwise shifting during transport.

Honey combed structures are used in the void fillers of U.S. Pat. Nos. 3,593,671 of Bramlett issued Jul. 26, 1971; 3,854,426 of Kinnune, Jr. issued Dec. 17, 1974; 4,109,587 of Jansen, Jr. issued Aug. 29, 1978; 4,372,717 of Sewell et al. issued Feb. 8, 1983 and 4,386,881 of Liebel issued Jun. 7, 1983. The problem with these honey combed structures, however, is that they are not readily lockable into an expanded state and their elongate, thin and flexible bodies are cumbersome to handle. Consequently, they are difficult to install, to remove and to store or transport.

Void fillers made of single box-like structures are shown in U.S. Pat. Nos. 3,534,691 of Carlomagno, Jr. issued Oct. 20, 1970; 4,363,579 of Rogers issued Dec. 14, 1992 and 4,494,897 of Rogers issued Jan. 22, 1985. While these single box void filler somewhat overcome the cumbersome characteristics of the honey combed structures, they lack handles for use in handling. Also, they often present sharp cutting edges at the ends which render grasping the void fillers from the ends difficult, if not dangerous. Accordingly, the common method of handling known fillers is to hold them by their sides to avoid the sharp edged ends. In addition, some have simple box-like structures which have loose members that are difficult to assemble for use and to disassemble for storage. Others employ members which block visibility through the void filler from the ends and thereby reduce safety and hinder installation and handling in general.

More recently void fillers have been developed which employ a pair of rectilinear hollow members which are secured together to provide an intermediate wall between the top and bottom walls of the void filler for enhanced rigidity. These are shown in U.S. Pat. Nos. 5,000,376 of Wojdyla issued Mar. 19, 1991 and 5,102,272 of Woods et al. issued Apr. 7, 1992. Disadvantageously, however, only single wall construction is used to form the top and bottom walls. Moreover, supplemental, multiple cross support members which extend between and connected to all opposite sides of both hollow members are required to obtain sufficient strength and to maintain the hollow members in an operative, noncollapsed configuration. These cross members block viewing through the hollow members. Visibility is blocked even to a greater extent than in the single box-like void fillers. Consequently, a handler must look around the void filler to see where it is located relative to the void to be filled in addition to not being able to see his own feet to create a significant safety problem, greater fatigue and reduced efficiency. In addition, because these supplemental cross support members are interconnected between opposite sides, substantial time for assembly from a collapsed condition and for disassembly to return the void filler to a noncollapsed condition is required.

SUMMARY OF THE INVENTION

It is therefore the principal object of the present invention to provide a collapsible void filling apparatus which overcomes the disadvantages of known void fillers. In the preferred embodiment this is achieved by providing the void filling apparatus with means for locking the void filler in a noncollapsed position which also provides an end handle easily moved to a nonlocking position that does not block visibility through the void filler when in a locked position.

Also, the object of the invention is obtained partly by providing a collapsible void filling apparatus comprising an elongate, hollow member with collapsible multiple sides forming an open passageway between a pair of opposite open ends and means including a locking member attached to the elongate hollow member and movable between a locking position in which both ends remain substantially open for viewing through the passageway and a nonlocking position, said locking member when in the locking position blocking collapse of the elongate, hollow member for use and when in the nonlocking position enabling collapse of the elongate, hollow member for storage.

Moreover, the object of the present invention is partly achieved by providing a collapsible void filling apparatus comprising a plurality of rectilinear, elongate, hollow members, each hollow member having four sides interconnected at adjacent edges and a pair of opposite ends, means for pivotally connecting the edges of adjacent sides together to facilitate collapse of the hollow member to a relatively flattened configuration, means for connecting the plurality of hollow members together in side by side relationship to form a generally rectangular composite body and a locking member carried by and movable from a position intermediate at least two of the plurality of elongate hollow members to a locking position within at least one of said at least two of the plurality of elongate hollow members to prevent collapse of the at least one elongate hollow member.

The object of the invention is also acquired by providing a collapsible void filling apparatus comprising an elongate, hollow member with four sides and a pair of opposite open ends, a locking member attached to one of the four sides and movable between a locking position and a nonlocking position, said locking member when in the locking position blocking collapse of the elongate, hollow member for use and at least one tab member attached to one of the four sides for movement between a holding position in which the at least one tab member blocks movement of the locking member out of the locking position and a nonholding position in which the locking member is movable out of the locking position.

Achievement in part of the object of the invention is also acquired through provision of a collapsible void filling apparatus comprising a pair of elongate parallel suspension walls of a first thickness and extending between opposite ends, a pair of elongate cross support end walls extending between the pair of suspension walls at the opposite ends having a second thickness substantially greater than said first thickness to provide relatively increased strength against stress applied in a direction perpendicular to the elongate direction of the cross support walls and means for maintaining the suspension walls in spaced parallel relationship.

The object of the invention is also acquired by providing a collapsible void filling apparatus comprising an elongate, collapsible, hollow member with four sides interconnected at adjacent sides and a pair of opposite ends and a locking member mounted to the hollow member at one of the pair of opposite ends for movement between a locking position and a nonlocking position, said locking member when in the locking position usable as a handle for carrying the hollow member.

BRIEF DESCRIPTION OF THE DRAWINGS

The foregoing objects and advantageous features of the invention will be explained in greater detail and others will be made apparent from the detailed description of the preferred embodiment of the invention that is given with reference to the several figures of the drawing, in which:

FIG. 5 is a front view of another embodiment like that of FIGS. 1 and 4 but in which a stronger, shorter body is achieved through the use of a single hollow member; and FIG. 6 is a front view of another embodiment like that of FIGS. 1 and 4 but in which a longer body is achieved by adding an intermediate hollow member.

DESCRIPTION OF THE PREFERRED EMBODIMENT

Figure 1:
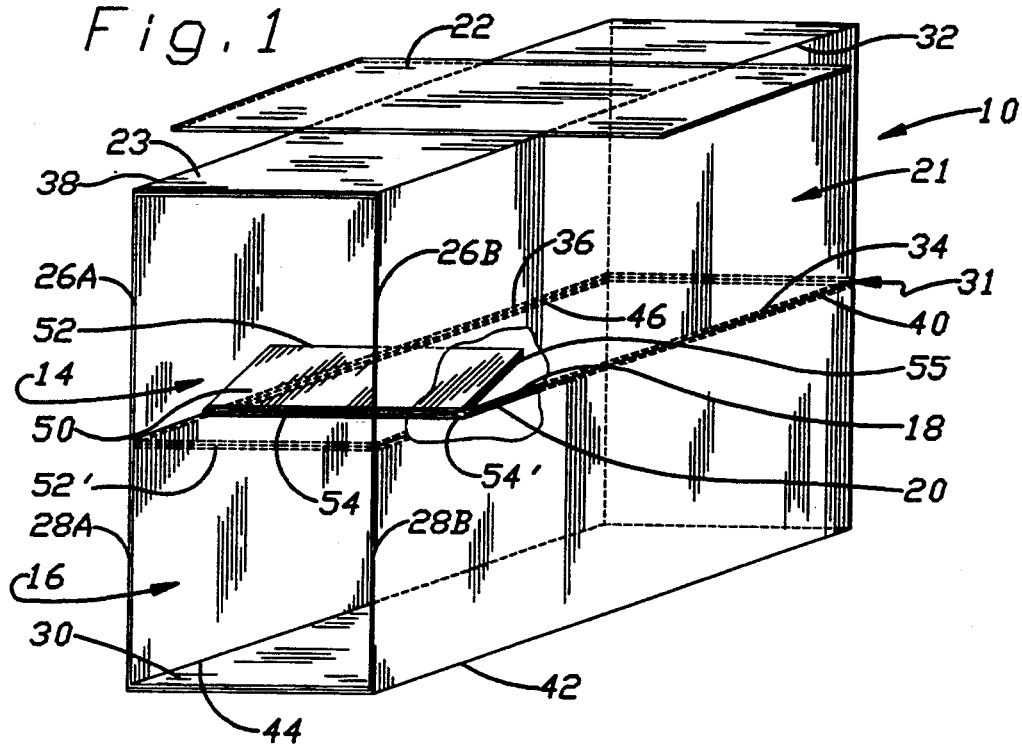
FIG. 1 is a perspective view of the preferred embodiment of the void filling apparatus in the expanded configuration with a section broken away to show the locking member in the locking position.
Figure 2A:
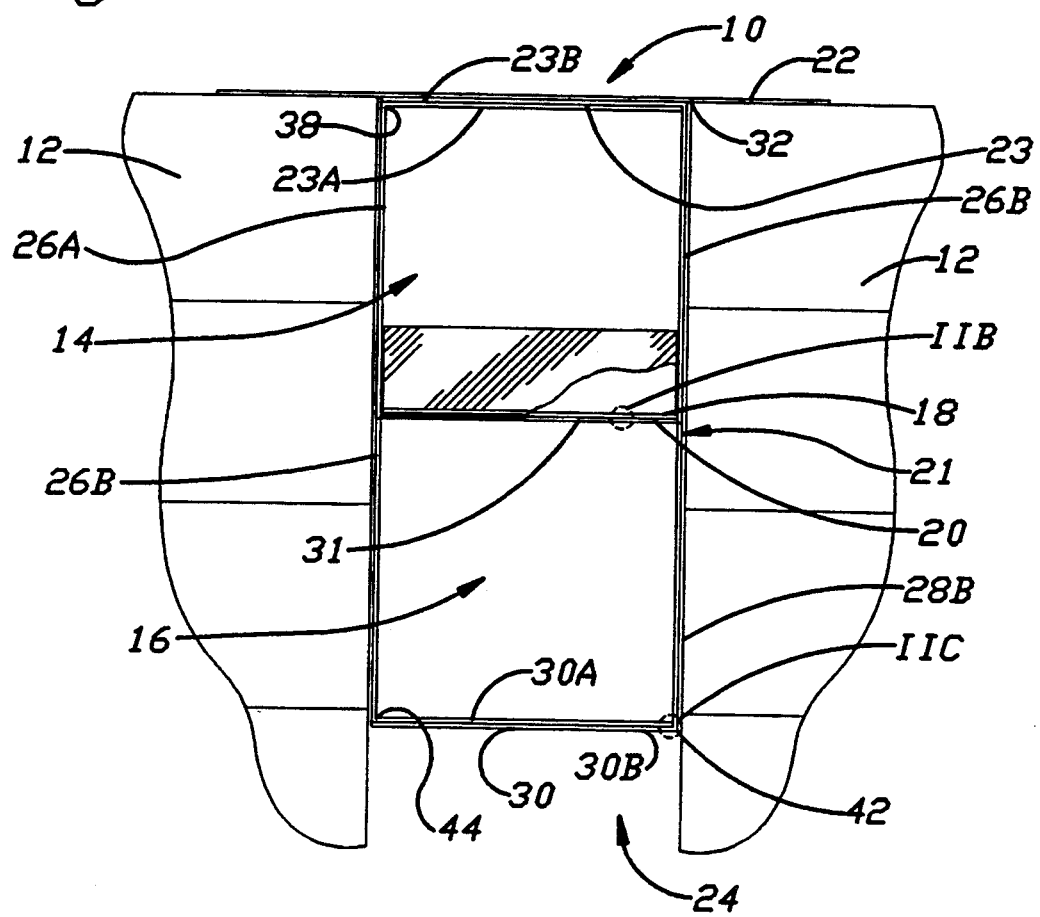
FIG. 2A is a front view of the void filling apparatus in an expanded, noncollapsed configuration for use to fill a space between two stacks of freight within a freight vehicle.

Referring now to FIG. 1, a preferred embodiment of the collapsible void filler, or void filling apparatus, 10 of the present invention is seen in an operative, noncollapsed state ready for use to maintain separation between spaced stacks of cargo 12, as seen in FIG. 2A.

Like known collapsible void fillers, the void filler 10 has a pair of substantially identical elongate, rectilinear hollow members 14 and 16 secured together at the rectangular bottom side wall 18 and top wall 20, to form a composite body 21, and a rectangular hanger 22 for suspending the composite body 21 in a void 24 between stacks of cargo 12, FIG. 2A. The bottom wall 18 and top wall 20 are secured together along their surfaces by a layer of suitable adhesive 19, preferably dextrin or hot melt adhesive. A pair of suspension sidewalls are defined by two pair of opposed suspension side wall segments 26A and 28A, and 26B and 28B, respectively, extending between the opposite edges of the top wall 23 and the bottom wall 18 of hollow member 14 and between the top wall 20 and a bottom wall 30 of hollow member 16. The top wall 23, bottom wall 18 together with top wall 20, and bottom wall 30 form three cross support walls and bear the lateral stress imposed upon the sides of the composite body 21 by cargo stacks 12 due to vehicular acceleration and resultant changes in the momentum of the cargo stacks 12, while the suspension wall formed by suspension wall segments 26A, 26B, 28A and 28B function primarily to merely hold the cross support members in proper spaced parallel alignment.

Figure 3:
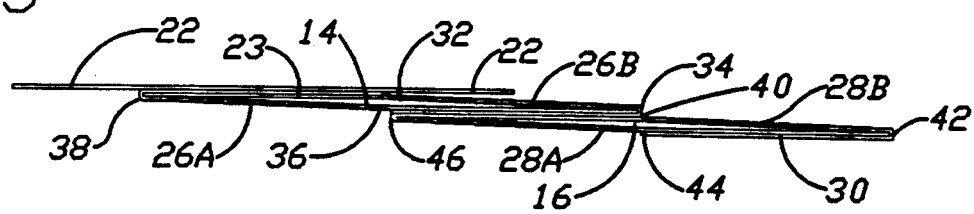
FIG. 3 is a front view of the void filling apparatus in the collapsed configuration.

All of the rectangular walls of each of the hollow members 14 and 16 are integrally formed from a single sheet of corrugated cardboard-like sheet material. Preferably, the strength of the corrugated cardboard is two to five hundred pound test corrugated paper, although nontest cardboard could be employed for light load applications. The thickness of the cardboard sheet material is preferably ¼ inch although, for most applications, cardboard of lesser or greater thickness could also be successfully employed. These are joined at their adjacent edges by fold lines 32, 34, 36 and 38, for hollow member 14, and fold lines 40, 42, 44 and 46, for hollow member 16, to enable collapse of the composite body 21 as shown in FIG. 3.

Figure 2B:
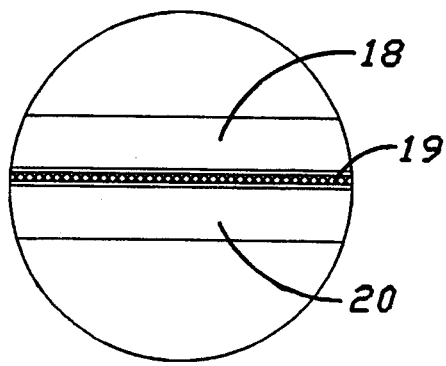
FIG. 2B is an enlargement of a portion IIB of the void filling apparatus of FIG. 1.

In known collapsible void fillers having a double boxlike construction, although a double ply wall is formed intermediate the top and bottom where the two discrete hollow members are joined, such as the intermediate, double ply, cross support wall 31 defined by bottom 18, top 20 and adhesive layer 19, FIG. 2B, the top end wall and bottom end wall are single ply walls. In addition, the elongate direction of the corrugations of the cardboard forming all the cross support walls is parallel to the direction of maximum force in order to achieve maximum strength. Consequently, it is necessary to provide supplemental cross support members which interconnect and interlock the opposed suspension side walls together. These supplemental cross support members lock their associated hollow member in a noncollapsed condition. However, they extend the entire distance between the top and bottom walls of the hollow members and consequently block the vision of a handler when trying to insert the void filler into a space directly in front of the handler. In addition to the difficulty associated with attempting to insert the void filler, the blocked vision caused by the supplemental cross supports can lead to injuries due to falls or collisions with resultant liability and other costs.

Because the supplemental cross supports also interlock opposed parallel suspension side walls, the void filler cannot be easily collapsed from its usable state and, once collapsed, cannot be easily reassembled. Accordingly, excessive time is spent on collapsing and assembling the known void fillers, or the inventory of void fillers is kept in an uncollapsed state between uses with the resultant inefficiency of a space utilization and reduced safety due to vision obstacles and fire hazards created by accumulation of uncollapsed void fillers on a shipping dock or the like.

Because the supplemental cross supports are recessed from the ends and are otherwise inaccessible from the ends, they fail to provide a suitable handle surface. Accordingly, the only surfaces facing the end are exposed sharp edges of cardboard corrugations extending between the opposed ends which can cause minor "paper cuts" and are thus generally avoided when using the known box-type void fillers. Instead, the known void fillers are carried by squeezing the sides between a person's hands to establish sufficient friction to overcome the weight of the void filler. This is unnecessarily fatiguing for workers, and if insufficient pressure is applied, as when a person is fatigued, slippage and accidents can result.

Still referring to FIGS. 1, 2A, 2B, 2C and 3, the preferred embodiment of the safety collapsible void filler 10 is seen to contain several novel features which overcome all these disadvantages of known box-type collapsible void fillers. First, it has been determined that, since resistance to forces caused by tipping of the cargo stack 12 can be most easily achieved where the moment arm is greatest at the top of the stack, it is sufficient to overcome these tipping forces merely by means of reinforcing the top end wall. Likewise, it has been determined that resistance to lateral sliding movement of the bottom of the cargo stack can be achieved by merely reinforcing the bottom wall 30 which is closer to the bottom of the stack 12 than the complete intermediate wall 31 defined by bottom side 18 and top side 20. Preferably, the reinforcement is achieved in two different ways. First, reinforcement is obtained by providing a second ply of corrugated cardboard of equal thickness as the suspension walls 26A, 26B, 28A and 28B, so both the top end wall 23 and the bottom end wall 30 have a thickness which is twice that of the suspension walls and is equal to the double ply thickness of composite intermediate cross support wall made of bottom wall 18 and top wall 20. Secondly, all the corrugations in the cross support walls are arranged to extend between the opposed suspension side walls for maximum resistance to collapsing forces imposed by the cargo stack 12. Consequently, the need for supplemental cross members which extend from top to bottom and from side to side and block the open vision passageway through the hollow member is eliminated.

Figure 2C:
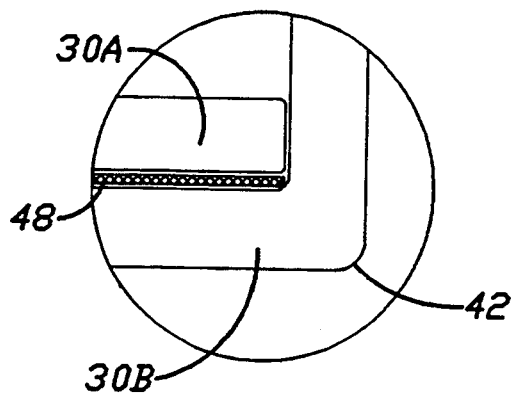
FIG. 2C is an enlargement of a portion IIC of the void filling apparatus.

As best seen in FIG. 2C, in the preferred embodiment, the double thickness of the bottom end wall 30 is achieved by overlapping one bottom end wall section 30A with another bottom wall section 30B which are adhered together by a layer 48 of adhesive material. As best seen in FIG. 2A, bottom end wall section 30B is integrally formed with the balance of the hollow member 16 and is pivotally connected to suspension wall segment 28B along fold line 42. It extends from fold line 42 and the suspension wall segment 28B to beneath the bottom edge of suspension wall segment 26B in fully coextensive underlying relationship with the bottom end wall section 30A. Likewise, bottom end wall section 30A is integrally formed with the remainder of the lower hollow member 16 and is pivotally connected thereto along fold line 44 and extends therefrom to an abutting relationship with the inside surfaces of the suspension wall 28B in fully coextensive overlying relationship with respect to bottom end wall section 30B. The adhesive layer 48 is preferably coextensive with the bottom end wall section 30A.

The upper end wall 23 is likewise comprised of two coextensive wall sections 23A and 23B which are pivotally connected to the suspension walls at fold lines 38 and 32 and adhered together along substantially their entire surface, with section 23A abutting against suspension wall segment 26B.

The end walls 23 and 30, due to the integral, overlapping and abutting relationship of their component wall sections, have been found to have sufficient strength to resist normal forces imposed on the composite body 21 even with a wall thickness only twice that of the suspension wall segments 26A, 26B, 28A and 28B. The interlocking, supplemental cross support members needed in known void fillers that block vision through the hollow members 14 and 16 are thereby successfully eliminated to provide a safer void filler.

Figure 4:
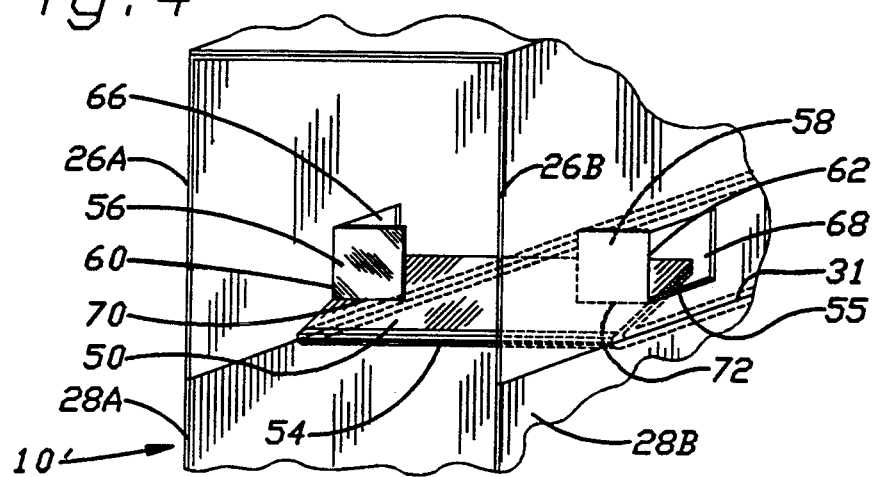
FIG. 4 is an enlarged perspective view of a portion of the of an alternative embodiment of the void filling apparatus which is substantially identical to that of FIG. 1 but in which tab members have been added to hold the locking member in the locking position.

Another important feature of the present invention is a locking member 50 which is movable from a locking position in which it blocks collapse of the void filler 10 as shown in FIG. 4, to maintain it in its operative state, as shown in FIGS. 1 and 2A, for use and insertion handling. The locking member 50 is integrally formed from, or defines an extension of, the composite intermediate cross support wall 31 formed by bottom wall 18 and top wall 20. It has a distal, movable edge 52 located in the interior of the hollow member 14 when pivoted along a fold line, or pivot edge, 54 to the locking position, and extends between the interior surface of the suspension side walls 26A and 26B to block their relative movement toward each other and thereby blocks collapse. Advantageously, since the locking member 50 is located intermediate hollow members 14 and 16, it is also capable of being pivoted into a locking position between side wall segments 28A and 28B.

When in an unlocked position, the edge 52 is located in a plane common to that of the composite intermediate cross support wall of bottom wall 18 and top wall 20 at location 52' shown in broken lines in FIG. 1. When in this unlocked position, there is nothing blocking movement of the walls of the hollow members toward each other and the rectangular hollow members forming a collapsed parallelogram, once the void filler 10 is removed from between the cargo stacks 12.

As best seen in FIG. 2A, advantageously the distal movable edge 52 does not extend all the way from the intermediate cross member 31 to the top cross support end wall 23 when in the locked position for enhanced visibility. In a locked position, the locking member 50 extends diagonally into the hollow member 14 relative to the cross support walls 23, 31 and 30. Visibility through the hollow member 14 is achievable even if the width of the locking member is increased to a width as great as the length of the suspension walls 26A and 26B due to adjustability of the angle of incline of the locking member 50 relative to the cross support walls 23 and 31. A wider locking member is extended deeper into the hollow member 14 and provides blocking force to a greater depth, if not height, for enhanced rigidity of the void filler when in the noncollapsed operative state.

However, in keeping with another important aspect of the invention, and to preclude visibility blockage for safety reasons, the locking member 50 has a width 85 which is less than the distance between top wall 23 and the internal wall 31. Achievement of another objective of the invention is obtained by making the width of the locking member 50 of a suitable dimension to enable dual use of the locking member 50 as a handle and as a locking member. Specifically, the width is selected to be sufficiently small for both the distal edge 52 to be reached by the tip of a person's fingers while the pivotal edge 54 is in the crook of their thumb to enable grasping the locking member in the person's hand. A width of approximately 3.5 inches for locking member, or handle, 50 has been found suitable for ease of grasping while still being sufficient for purposes of blocking strength and depth of reach into the interior of hollow member 14.

Advantageously, the pivot edge 54 is without open edges and forms a smooth curved surface at 54' as best seen in FIGS. 1 and 4 without exposed edges to preclude paper cuts and the like from the relatively thin, sharp interior wall components of the corrugated cardboard sheet material. Consequently, the void filler 10 can be easily carried in front of a person with one or both hands grasping the locking member 50 in the locking position while maintaining a relatively unobstructed frontal view past the edge 52 and through the open passageway between the opposite open ends. In this way the user can easily visually guide the void filler into the space between the cargo stacks 12 while keeping the void filler 10 in the operative condition, as shown. Advantageously, at the same time the locking member 50 is being used as a handle, it is manually held in the locking position, and thus the absolute need for additional means for holding the locking member in locking position during handling is eliminated. Once the body 21 is inserted into the void and suspended by hanger 22, gravity and the restriction of movement due to the cargo stacks 12 will tend to maintain the void filler in its operative state as shown.

There are other advantageous features of the locking member, or handle, 50. As best seen in FIG. 1, pivot edge 54 of locking member 50 is recessed from the open end of the hollow member 14, so as not to interfere with the location of stacks adjacent to the front open end of the void filling apparatus 10. Preferably, the locking member is flush with the frontal open end of hollow member 14 when in the nonlocking position, indicated by broken line 52', to maintain compactness of the void filler when in a collapsed position as shown in FIG. 3.

As best seen in FIG. 1, the elongate corrugations of the corrugated sheet material from which the locking member 50, as well as those of the intermediate cross support walls 31, 23 and 30, extend in a direction between the suspension side wall segments 26A and 28A and 26B and 28B for maximum resistance to the stress which is applied by the cargo stacks 12 in that direction. In the known box-like void fillers which require supplemental cross support members, on the other hand, the corrugations of the three primary cross support walls extend in a transverse direction thus reducing their effectiveness to resist crushing forces applied to the body 21. In addition, because the corrugations run parallel to the edge 52 of the handle 50, their sharp edges, such as those which appear at one of the opposite ends 55 of the locking member 50 in FIG. 1 do not appear at the open ends. Instead, a smooth surface is provided at the edges of the opposite ends, such as shown in FIG. 2B, to reduce the risk of cuts. Likewise, the edges of suspension side wall segments 26A, 28A, 26B, 28B, as well as the cross support walls 23, 30 and 31 at the open end adjacent the locking member 52, present a smooth surface to reduce the number of sharp edges. In addition, since the elongate direction of the corrugations is parallel to the pivotal edge 54, the fold along the edge 54 and the pivotal movement is enhanced.

Turning now to FIG. 4, while it is not necessary to provide special means for holding the locking member 50 in the locking position when it is being handled or when actually in place, in the alternate embodiment 10' of the void filler 10 of FIG. 1, a pair of tab members 56 and 58 are provided to hold the locking member 50 in a locking position. Tabs 56 and 58 are substantially identical except for being mirror images of each other and being carried by opposed suspension side wall segments 26A and 26B. Both are rectangular and have three sides die cut from the suspension side wall from which they are formed and a fourth side which is defined by fold lines 60 and 62, respectively. The tab members 56 and 58 pivot inwardly along their fold lines 60 and 62 when their outer surfaces are pushed inwardly away from the surfaces of their suspension walls to form tab openings 66 and 68, respectively.

After the locking member 50 is moved to a locking position beneath lower edge 70 and 72, other tab members 56 and 58 are pushed inwardly, as shown in FIG. 4, to block the locking member 50 from returning to the nonlocking position to enable collapse. Tab members 56 and 58 thereby hold the locking member 50 against movement to the nonlocking position. Since the direction of fold lines, or pivot edges, 60 and 62 of the tab members 56 and 58 are transverse to the pivot, or fold line, 54 of the locking member, any force applied by the locking member 50 to the bearing edges 70 and 72 is not applied in a direction which would cause the tab members 56 and 58 to return to a nonholding position within their respective cut openings 66 and 68. Although, use of two tab members 56 and 58 is preferred, the function of holding could be performed with a single tab member. While the tab members are located in the side walls, a tab member could, of course, also be provided in the intermediate wall 31. To release the hold on locking member 50, the tab members 56 and 58 merely return to a nonholding position flush within their die cut openings 66 and 68.

In some applications, when tipping is the principal type of movement to be prevented, another form 10" of the void filler 10 is employable, as seen in FIG. 5, which has only a single hollow member 74 in which both of the opposed cross support end walls 76 and 78 are formed of overlapping and coadhered wall sections 76A and 76B, and 78A and 78B, like cross support wall 30 of FIG. 2C. The double thickness and overlapping and abutting relationship of two overlying wall sections to form both end walls together with proper alignment of the corrugations for maximum resistance against crushing forces has been found to provide substantial strength which is sufficient in these applications. Although not shown, the tab members 56 and 58 are employed with form 10", if desired.

Referring now to FIG. 6, a third form 10''' of the void filler 10 of FIG. 1 is shown for use in applications requiring greater restraint over a larger distance, such as when the cargo stacks 12 are taller, heavier or more prone to sliding movement. The void filler 10''' is substantially identical to the void filler of FIG. 1 or FIG. 4 except at least one intermediate hollow member 80 is interposed between the end hollow members 14 and 16. The intermediate hollow member 80 has a top wall 82 and a bottom wall 84 respectively adhered to bottom cross support wall 18 and top cross support wall 20. Preferably, since the adherence together of walls 82 and 18 and walls 84 and 20 form composite intermediate cross support walls, the hollow member 80 has all walls of single thickness, except such seams needed to form an adhesive joint. The locking member 50 is integrally formed with bottom wall 18 and top wall 82, and the tab members 56 and 58 are in suspension side walls 26A and 26B, but otherwise the form 10''' is identical to void filler 10 shown in FIG. 1. If additional strength is needed, either or both of the top wall 82 and the bottom wall 84 are formed of two overlapping and abutting wall sections like wall sections 30A and 30B of FIG. 2A. While only a single intermediate hollow member 80 is shown, alternatively, two or more intermediate hollow members substantially identical to members 80 or 16 are added for additional height to body 21 and for additional strength.

While a detailed description of the preferred embodiment of the invention has been given, it should be appreciated that many variations can be made thereto without departing from the scope of the invention as set forth in the appended claims. While each of the side walls 26A, 26B, 28A and 28B are formed from a single sheet, in the event a length, or depth, of body 21 is desired which is greater than the standard cardboard sheet widths that are commercially available, two or more sheets are telescopically secured together to form a single, continuous wall. Also, while corrugated cardboard is the preferred material for constructing the void filler, other like paper or other material could be used.

We claim:

1. A collapsible void filling apparatus, comprising:
   a plurality of rectilinear, elongate, hollow members, each of the hollow members having four sides interconnected at adjacent edges, a pair of opposite ends and two pairs of opposite sides;
   means for pivotally connecting the edges of adjacent sides together to facilitate collapse of the hollow members to a relatively flattened configuration;
   means for connecting the plurality of hollow members together in side to side relationship to form a generally rectangular composite body; and
   a locking member carried by at least two of the plurality of hollow members and movable from a position intermediate at least two of the plurality of hollow members to a locking position within at least one of said at least two of the plurality of hollow members to prevent collapse of the at least one hollow member, the locking member being elongate and extending between and engaging one pair of the opposite sides of the at least one of said at least two of the plurality of hollow members to hold the one pair of opposite sides spaced apart when in the locking position.

2. A collapsible void filling apparatus, comprising:
   a plurality of rectilinear, elongate, hollow members, each of the hollow members having four sides interconnected at adjacent edges and a pair of opposite ends;
   means for pivotally connecting the edges of adjacent sides together to facilitate collapse of the hollow members to a relatively flattened configuration;
   means for connecting the plurality of hollow members together in side to side relationship to form a generally rectangular composite body;
   a hanger;
   means for mounting the hanger to one of the four sides of one of the plurality of hollow members;
   a locking member carried by at least two of the plurality of hollow members and movable from a position intermediate at least two of the plurality of hollow members to a locking position within at least one of said at least two of the plurality of hollow members to prevent collapse of the at least one hollow member, and
   means for mounting the locking member to another one of the four sides of the one hollow member, said another one of the sides being opposite to the one side;
   the locking member being integrally formed with said another one of the four sides of the one hollow member and one side of another of the plurality of hollow members.

3. The collapsible void filling apparatus of claim 2 in which said hollow member connecting means includes means for permanently connecting said another one of the sides of the one hollow member to one side of another one of the hollow members.

4. The collapsible void filling apparatus of claim 2 in which the locking member is mounted to at least one of the hollow members adjacent one of the pair of opposite ends.

5. The collapsible void filling apparatus of claim 4 in which the locking member is mounted to one of the opposite ends of one of the hollow members for pivotal movement into one of the hollow members.

6. The collapsible void filling apparatus of claim 2 including a tab member carried by the at least one hollow member for holding the locking member against removal from the locking position.

7. A collapsible void filling apparatus, comprising:
   an elongate, hollow member with four sides and a pair of opposite open ends;
   a locking member attached to one of the four sides for movement between a locking position and a nonlocking position, said locking member when in the locking position blocking collapse of the elongate, hollow member for use; and
   two tab members attached to a pair of opposite ones of the four sides for movement between a holding position in which at least one of the two tab members blocks movement of the locking member out of the locking position and a nonholding position in which the locking member is movable out of the locking position.

8. The collapsible void filling apparatus of claim 7 including
   a hanger, and
   means for mounting the hanger to another of the four sides opposite the one side to which the locking member is attached.

9. The collapsible void filling apparatus of claim 7 in which the locking member has a smooth turned edge.

10. The collapsible void filling apparatus of claim 7 in which the locking member is integral with one of the four sides.

11. The locking member of claim 7 wherein
    the locking member is mounted for movement about a pivot axis, and
    each of the two tab members is pivotally connected to another one of the four sides adjacent to the one side to which the locking member is attached and along an axis transverse to the pivot axis of the locking member.

12. The collapsible void filling apparatus of claim 7 in which each of the tab members is integrally formed with the one of the four sides to which the respective tab member is attached for movement.

13. A collapsible void filling apparatus with opposite ends and two sides, comprising:
    a pair of elongate parallel suspension walls of a first thickness and extending between the opposite ends;
    a pair of elongate cross support end walls extending between the pair of suspension walls at the opposite ends having a second thickness substantially greater than said first thickness to provide relatively increased strength against stress applied in a direction transverse to the elongate direction of the cross support walls including a first cross support intermediate wall member located intermediate the end walls and extending between the pair of suspension walls and having a third thickness substantially greater than the first thickness, and a second cross support intermediate wall located intermediate the end walls and spaced from the first intermediate wall which extends between the pair of suspension walls and having a thickness substantially greater than the first thickness; and means for maintaining the suspension walls in spaced parallel relationship.

14. The collapsible void filling apparatus of claim 13 in which the second thickness is on the order of twice the first thickness.

15. The collapsible void filling apparatus of claim 13 in which said suspension walls are formed of sheet material and said pair of cross support walls are formed by double ply sheets of said sheet material.

16. The collapsible void filling apparatus of claim 13 in which one of the pair of suspension walls in on one side of the collapsible void filling apparatus and the other of the pair of suspension walls is on the other side of the collapsible void filling apparatus, and in which said cross support walls are integrally formed with at least part of the suspension walls by extending a part of the material of said one suspension wall to said other side of the apparatus and by extending a part of the material of said other suspension wall to said one side of the apparatus.

17. The collapsible void filling apparatus of claim 13 in which said third thickness is substantially equal to the second thickness.;

18. The collapsible void filling apparatus of claim 13 in which the suspension walls are formed from sheet material, and the intermediate walls are formed by at least a double ply of the sheet material.

19. The collapsible void filling apparatus of claim 13 in which the intermediate walls are formed by securing together a pair of component intermediate walls integrally formed with said pair of suspension walls, respectively.

20. The collapsible void filling apparatus of claim 13 in which the first and second intermediate cross support walls are opposite sides of a rectangular hollow member located intermediate the cross support end walls.

21. The collapsible void filling apparatus of claim 13 in which all the walls are made of cardboard with elongate corrugations extending in a direction between the opposite ends.

22. The collapsible void filling apparatus of claim 1 in which the locking member when in the locking position is usable for carrying the apparatus without increasing any overall outside dimension of the apparatus.

23. The collapsible void filling apparatus of claim 1 in which the locking member has a turned edge to facilitate handling.

24. The collapsible void filling apparatus of claim 23 in which the locking member has a distal edge spaced from the turned edge by an amount sufficiently small for both the turned edge and distal edge to be simultaneously grasped by a person's hand and further allow the person's hand upon grasping the locking member to remain entirely within the apparatus.

* * * * *